United States Patent [19]

Kotera et al.

[11] Patent Number: 4,457,794
[45] Date of Patent: Jul. 3, 1984

[54] METHOD FOR MANUFACTURING OPTICAL MEMORY DISC

[75] Inventors: Koichi Kotera, Hyogo; Takeo Ohta, Nara, both of Japan

[73] Assignee: Matsushita Electric Industrial Co., Ltd., Osaka, Japan

[21] Appl. No.: 507,155

[22] Filed: Jun. 23, 1983

[30] Foreign Application Priority Data

Jun. 25, 1982 [JP] Japan ............................ 57-110226
Dec. 13, 1982 [JP] Japan ............................ 57-218609

[51] Int. Cl.³ .......................................... G01D 15/34
[52] U.S. Cl. ........................................ 156/64; 477/16; 477/164
[58] Field of Search ................... 427/10, 164; 156/64

[56] References Cited

U.S. PATENT DOCUMENTS 3,971,874  7/1976  Ohta et al. .................... 427/164 X
4,397,923  8/1983  Yasuda et al. ................. 427/164 X Primary Examiner—James R. Hoffman
Attorney, Agent, or Firm—Burgess, Ryan and Wayne

[57] ABSTRACT

Proposed is a method for manufacturing an optical memory disc having a pregrooved substrate and a recording film on the pregrooved substrate. In the step of depositing the recording film on the pregrooved substrate, light is incident on the pregrooved substrate, and at least one of exposure amounts of light reflected by and light transmitted through the pregrooved substrate and the recording film while the recording film is being deposited on the pregrooved substrate is measured. When one of the exposure amounts of light reflected by and light transmitted through the pregrooved substrate and the recording film has reached the corresponding preset exposure amount, the deposition of the recording film is stopped.

6 Claims, 5 Drawing Figures

METHOD FOR MANUFACTURING OPTICAL MEMORY DISC

BACKGROUND OF THE INVENTION

I. Field of the Invention

The present invention relates to a method for manufacturing an optical memory disc for recording bit data on a recording film by beam radiation.

II. Description of the Prior Art

Optical memory discs which are capable of recording/reproduction in real time have been recently proposed as a large-capacity high-density memory. In an optical memory disc, bit data is recorded by beam radiation on a disc which is driven at a high speed. The recorded data is then read out by a beam. An optical pickup head is not brought into contact with the optical disc to perform recording/reproduction. Therefore, an optical memory disc of this type has advantages in that the pickup head and the optical disc may not be damaged, and in that the data access can be performed at a high speed.

In general, an optical memory disc comprises a transparent substrate on which concentric or helical pregrooves or projections are formed as tracks, a recording film is deposited thereon by, for example, vapor deposition, and a plastic protective film is formed on the recording film. The thickness of the recording film is controlled by a quartz oscillator gauge. At the time of recording/reproduction, the tracks are scanned with a beam spot under tracking control and focusing control.

Two types of optical memory disc are available at present: a reflecting memory disc and a transmitting memory disc.

In the reflecting memory disc, tracking control and focusing control are performed on the basis of light reflection. When a reflectance varies in accordance with individual discs, it is very difficult to perform tracking control and focusing control. In this case, a deck must be adjusted in accordance with a given optical disc so as to perform optimum tracking and focusing control operations. Therefore, in order to use different discs in a single deck, the reflectances of these discs must be kept at a given value.

On the other hand, in the transmitting memory disc, the transmittances of different discs must also be kept at a given value.

A disc reflectance Rd is a sum of a reflectance Rs of the substrate having pregrooves and a reflectance Rf of the recording film as follows:

$$Rd = Rs + Rf$$

The reflectance Rf of the recording film depends on the thickness of the recording film, and varies in accordance with an interference effect of the film. However, it is possible to control the film thickness by a quartz oscillator gauge. Therefore, the recording film may have a given reflectance. However, the reflectance Rs of the pregrooved substrate is influenced by the depth and shape of the pregrooves. In particular, when the pregrooves are formed by stamper transfer, the depth and shape of the pregrooves may vary in accordance with the shape of each stamper, and hence the reflectance Rs of the pregrooved substrate varies. Even if the thickness of the recording film is kept at a given value so as to set the reflectance Rf at a given value, the reflectance Rd of the disc varies in accordance with the variation in the reflectance Rs of the substrate. This drawback is also applicable to the transmittance of the transmitting memory disc.

SUMMARY OF THE INVENTION

It is, therefore, an object of the present invention to provide a method for manufacturing a highly sensitive optical memory disc wherein a reflectance or transmittance of a disc can be kept at a given value even if a reflectance or transmittance of a pregrooved substrate varies.

In order to achieve the above and other objects of the present invention, there is provided a method for manufacturing an optical memory disc, comprising the step of, in depositing a recording film on a pregrooved substrate, arranging a photosensor for detecting an amount of light reflected by or transmitted through said pregrooved substrate upon radiation of a predetermined amount of light on said pregrooved substrate, measuring a total amount of light reflected by or transmitted through said pregrooved substrate and said recording film being deposited thereon, and terminating deposition of said recording medium on said pregrooved substrate when the total amount of light actually reflected by or transmitted through said pregrooved substrate has reached a preset value. As a result, an optical memory disc having a desired reflectance or transmittance can be obtained.

A thin tellurium suboxide film is used as a recording film which is controlled in its film thickness and the surface of which is inactivated by annealing, thereby obtaining a highly sensitive, stable optical memory disc.

The above and other objects, features and advantages will be apparent from the following detailed description of a preferred embodiment taken in conjunction with the accompanying drawings.

DETAILED DESCRIPTION OF THE PREFERRED EMBODIMENT

Figure 1:
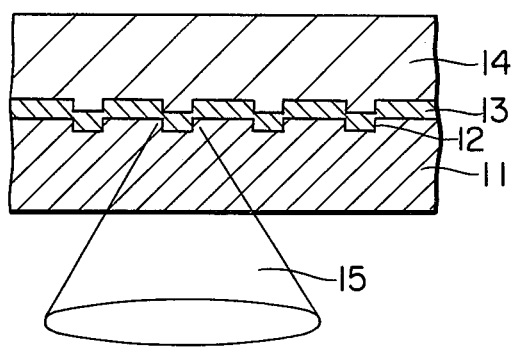
FIG. 1 is a sectional view of an optical memory disc to which the present invention is applied.

FIG. 1 shows an optical memory disc to which the present invention is applied. Concentric or spiral pregroove tracks 12 are formed on a major surface of a transparent substrate 11. A recording film 13 is formed on the pregrooved transparent substrate 11 by deposition or the like. A plastic protective layer 14 is formed on the recording film 13 so as to protect it. A beam spot 15 irradiates the transparent substrate 11 of the optical disc at the time of recording/reproduction. Tracking control and focusing control are performed such that the tracks 12 are scanned with the beam spot 15.

Figure 2:
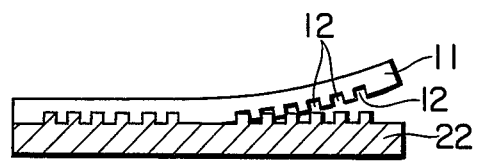
FIG. 2 is a representation for explaining the formation of tracks by stamper transfer.

The tracks 12 of the substrate 11 can be formed by transfer using a stamper 22, as shown in FIG. 2.

Figure 3:
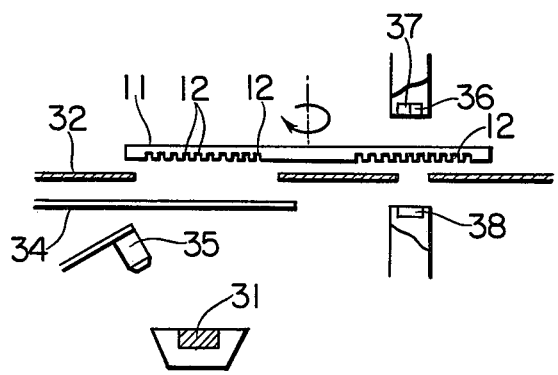
FIG. 3 is a representation for explaining a method for depositing a recording medium according to an embodiment of the present invention.

The principle feature of the present invention lies in the formation of the recording film on the pregrooved substrate. FIG. 3 is a representation for explaining a method for depositing the recording film according to an embodiment of the present invention. It should be noted that the reflectance of the optical memory disc is set at a predetermined value, and that the recording film is formed by deposition.

A vapor source 31 is heated by resistance heating or electron beam heating so as to evaporate a deposition material. The deposition area is limited by a mask 32, and the recording film is deposited on a portion of the pregrooved substrate 11 which has the tracks 12 at a 1.6 μm pitch. The start/end of deposition on the pregrooved substrate 11 is controlled by opening/closing of a shutter 34. The pregrooved substrate 11 is rotated at the time of deposition so as to uniformly form a high-quality recording film. The recording film is not only deposited on the pregrooved substrate 11 but also on a quartz oscillator film gauge head 35. The deposition rate is thus controlled by the quartz oscillator film gauge. A beam spot having a diameter of 5 mm and in a predetermined exposure amount from a light source 36 irradiates a surface portion of the pregrooved substrate 11 so as to allow a photosensor 37 to detect an amount of light reflected by the recording film. The above-mentioned surface portion of the pregrooved substrate 11 does not itself have pregrooves, but opposes a pregrooved surface portion.

Figure 4:
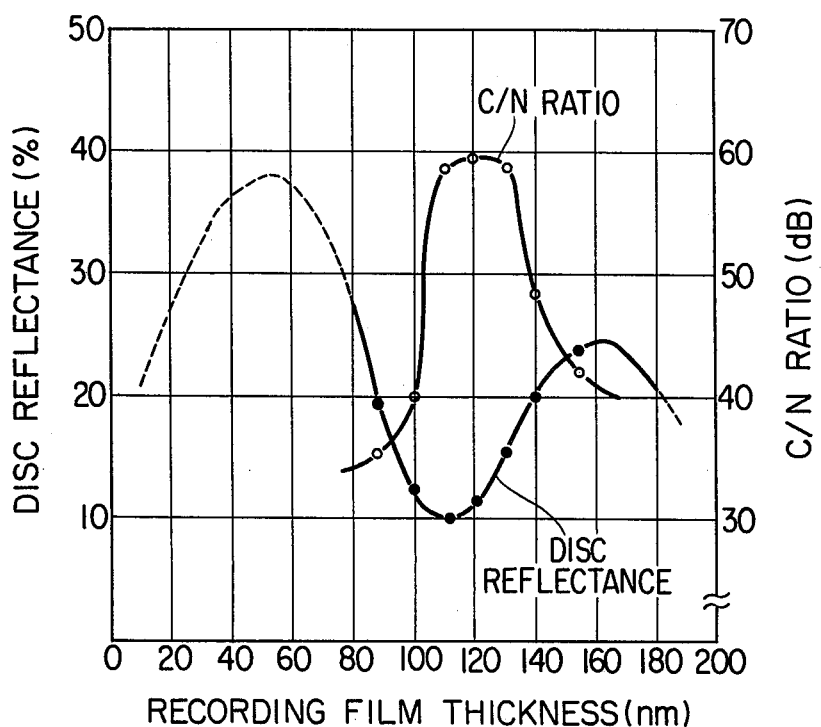
FIG. 4 is a graph for explaining the disc reflectance and the C/N ratio as a function of the recording film thickness when a tellurium suboxide $TeO_x$ ($0 < x < 2$) is used for the recording film.

An example will be described in detail wherein a transparent acrylic resin is used as a substrate material, and a thin film containing a tellurium suboxide $TeO_x$ ($0<x<2$) as a major component is used as the recording film. The recording film is subject to phase transition upon irradiation with the beam spot thereby increasing its refractive index and absorption coefficient, so that the recording film is set in the recording mode. The recording/reproduction characteristics of the thin film of a tellurium suboxide $TeO_x$ ($0<x<2$) are greatly influenced by the film thickness. When the recording film has a thickness in a range between 110 nm and 130 nm, it has high recording/reproduction characteristics. FIG. 4 is a graph for explaining the relationships between the disc reflectance (%) and the film thickness (nm) and between the C/N ratio (when recorded at a frequency of 5 MHz) as one of the recording/reproduction characteristics and the film thickness. For this purpose, various types of optical memory discs were prepared such that tellurium suboxide $TeO_x$ ($x=1$) was deposited on pregrooved substrates (each having a pregroove depth of 0.07 μm) to different thicknesses of the tellurium suboxide film, and plastic protective films were respectively formed on the resultant structures. When the recording film has a thickness of 110 nm, the reflectance of the disc becomes minimum due to an interference effect of the film. When the film thickness is increased from 110 nm, the reflectance of the disc is increased. On the other hand, the C/N ratio is as high as 60 dB for a film thickness in the range between 110 nm and 130 nm. Therefore, the recording film must be deposited on the substrate to a thickness falling within the range between 110 nm and 130 nm. It should be noted that the thickness of the recording film can be measured by a quartz oscillator film gauge.

When a tellurium suboxide $TeO_x$ ($0<x<2$) is used as the recording film, a total reflectance of the pregrooved substrate and the recording film is measured during the deposition of the recording film. When the total reflectance has reached a preset value and the thickness of the recording film falls within the range between 110 nm and 130 nm, film deposition is stopped. As previously described, a tellurium suboxide $TeO_x$ ($0<x<2$) for the recording film is subject to phase transition upon irradiation with the beam spot, thereby increasing its refractive index and absorption coefficient, so that the recording film is set in the recording mode. Since a change in volume of the recording film is not utilized, the protective film can be adhered to the recording film through an adhesive, thereby providing a rigid optical memory disc which is easy to handle.

However, when such an adhesive, for example, a photo-setting resin, is used to adhere the protective film onto the thin $TeO_x$ film or recording film, a C/N ratio is slightly decreased.

Since the surface of the thin $TeO_x$ film deposited by vacuum deposition is very active, the thin $TeO_x$ film reacts with the photo-setting resin when the photo-setting resin is applied prior to setting. As a result, the surface properties of the thin $TeO_x$ film change. Even after the adhesive resin is set by beam radiation, the resin component continues to diffuse in the thin $TeO_x$ film, thereby degrading the recording/reproduction characteristics.

In order to eliminate the drawback described above, after the thin $TeO_x$ film is deposited on the pregrooved substrate, the obtained structure is annealed in an oxygen atmosphere so as to form an inert layer in the surface layer of the thin $TeO_x$ film. This inert layer consists of tellurium dioxide ($TeO_2$) as its major component. Under this condition, the protective film is adhered to the thin $TeO_x$ film through the $TeO_2$ film, thereby eliminating the chemical reaction between the adhesive and the recording film. The oxygen atmosphere is obtained by forced flow of oxygen or a clean atmospheric condition. The annealing temperature preferably falls within a range between 40° C. and 80° C. Since the pregrooved substrate is made of a plastic consisting of an acrylic resin as its major component, the plastic is softened when the annealing temperature exceeds 80° C. The edges of the tracks become rounded, degrading the tracking characteristics.

The inert layer which contains $TeO_2$ as its major component and which is formed upon thermal oxidation of the thin $TeO_x$ film must have a thickness of 1 nm or more. Under this condition, even if the photo-setting resin is applied to the surface of the $TeO_2$ inert layer, any change in the properties of the thin $TeO_x$ film or recording film is prevented by the inert layer. Furthermore, the photo-setting resin component may not diffuse into the recording film.

According to this embodiment described above, even if pregrooved substrates having different reflectances are used, standard optical memory discs can be manufactured so as to have a given reflectance and excellent recording/reproduction characteristics. On the other hand, in order to manufacture optical memory discs having a predetermined transmittance, a photosensor 38 as shown in FIG. 3 must be arranged to detect the amount of light transmitted through the optical memory disc, thereby controlling the transmittance of the disc in the same manner as the reflectance thereof. The thickness of the thin $TeO_x$ film falls within the range between 110 nm and 130 nm and a thin $TeO_2$ inert layer is formed by annealing, thereby obtaining a highly sensitive optical memory disc.

In the above embodiment, acrylic resin is used for the pregrooved substrate. However, glass or any other resin such as polycarbonate may be used for the pregrooved substrate. Alternatively, a layer of UV curing resin or the like with grooves may be formed on the transparent substrate.

The total reflectance or transmittance of the disc including the pregrooved substrate and the recording film is measured while the recording film is being deposited on the pregrooved substrate. When the total reflectance or transmittance has reached a preset reflectance or transmittance, the deposition of the recording film is stopped. Variations in reflectance or transmittance of the optical memory discs, which are caused by variations in reflectance or transmittance of the pregrooved substrates, can be eliminated. As a result, a reflectance or transmittance can be obtained for each disc which complies with the specifications. Furthermore, a highly sensitive optical memory disc can be provided, resulting in practical advantages in a variety of industrial applications.

A typical example of the optical memory device manufactured by the method of the present invention will be described in detail with reference to FIG. 5.

Figure 5:
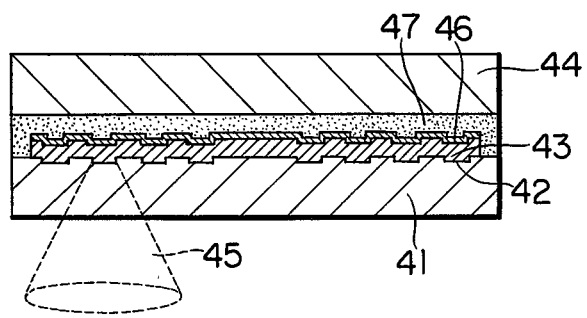
FIG. 5 is a sectional view of a disc prepared by the method of the present invention.

FIG. 5 is a sectional view of a typical reflecting optical memory disc. A thin $TeO_x$ film 43 is deposited by vacuum deposition on a plastic pregrooved substrate 41 to a thickness of about 0.1 $\mu$m. The pregrooved substrate 41 has concentric or spiral pregroove tracks 42. The tracks 42 have a guide track function for a laser beam spot 45. The depth of each of the tracks 42 corresponds to $\frac{1}{8}$ wavelength of the laser beam. The width of each of the tracks 42 corresponds to a bit width of a pit formed by the laser beam.

The pregrooved substrate having the thin $TeO_x$ film 43 thereon is annealed in an oxygen atmosphere so as to form an inert layer 46 on the surface of the thin $TeO_x$ film 43. The inert layer 46 has $TeO_2$ as its major component. The oxygen atmosphere is obtained by forced flow of oxygen or a clean atmospheric condition. The annealing temperature preferably falls within a range between 40° C. and 80° C. Since the pregrooved substrate 41 which has the tracks 42 is made of a plastic material, the plastic material is softened when the annealing temperature exceeds 80° C. The edges of the tracks 42 become rounded, thus degrading the tracking characteristics.

The inert layer 46 which is formed by thermal oxidation of the thin $TeO_x$ film 43 and which has $TeO_2$ as its major component must have a thickness of 10 Å or more. Under this condition, even if a photo-setting resin 47 (which is not set) is applied to the recording film which comprises the thin $TeO_x$ film and the inert layer 46, any change in properties of the recording film is prevented by the inert layer 46. The components of the photo-setting resin 47 may not diffuse into the recording film.

After the photo-setting resin 47 is applied to the recording film, a protective plastic film 44 is brought into tight contact with and pressed against the photo-setting resin 47. The photo-setting resin 47 is then set by a proper exposure amount of light, thereby adhering the protective film 44 to the recording film and hence providing an optical memory disc.

When a signal having a single frequency of 5 MHz is recorded on the optical memory disc thus obtained, the C/N ratio is not less than 56 dB. The C/N ratio after adhesion of the protective film through the photo-setting resin may not be substantially decreased as compared with the C/N ratio prior thereto. Even in the optical memory disc wherein the protective film is tightly adhered to the recording film through the adhesive, the C/N ratio may not be substantially decreased. As a result, a highly sensitive optical memory disc may be manufactured which has a high mechanical strength and is easy to handle.

What is claimed is:

1. A method for manufacturing an optical memory disc, comprising the steps of, in depositing a recording film on a pregrooved substrate, arranging a photosensor for detecting at least one of exposure amounts of light reflected by and light transmitted through said pregrooved substrate upon radiation of light onto said pregrooved substrate, measuring at least one of total exposure amounts of light reflected by and light transmitted through said pregrooved substrate and said recording film while said recording film is being deposited on said pregrooved substrate, and terminating deposition of said recording film on said pregrooved substrate when said at least one of the total exposure amounts reaches a preset one of total exposure amounts of light reflected by and light transmitted through said pregrooved substrate and said recording film.

2. A method according to claim 1, wherein the radiation of light is performed from one surface of said pregrooved substrate which opposes the other surface having pregrooves.

3. A method according to claim 1, wherein said recording film deposited on said pregrooved substrate comprises a thin film of a tellurium suboxide $TeO_x$ ($0 < x < 2$).

4. A method according to claim 3, wherein said recording film deposited on said pregrooved substrate has a thickness falling within a range between 110 nm and 130 nm.

5. A method according to claim 3, further including the steps of annealing said thin film of the tellurium suboxide $TeO_x$ formed on said pregrooved substrate in an oxygen atmosphere so as to form an inert layer having $TeO_2$ as a major component in a surface layer of said thin film, and adhering a protective layer onto said inert layer through an adhesive.

6. A method according to claim 5, wherein the annealing step is performed at a temperature in a range between 40° C. and 80° C.

* * * * *